(12) United States Patent
Hendry

(10) Patent No.: US 9,022,844 B2
(45) Date of Patent: May 5, 2015

(54) AIR CONDITIONING APPARATUS

(75) Inventor: Jason Hendry, Milford, MI (US)

(73) Assignee: DENSO International America, Inc., Southfield, MI (US)

( * ) Notice: Subject to any disclaimer, the term of this patent is extended or adjusted under 35 U.S.C. 154(b) by 1066 days.

(21) Appl. No.: 13/006,568

(22) Filed: Jan. 14, 2011

(65) Prior Publication Data

US 2011/0239690 A1 Oct. 6, 2011

Related U.S. Application Data

(60) Provisional application No. 61/319,805, filed on Mar. 31, 2010.

(51) Int. Cl.
 *B60H 3/00* (2006.01)
 *B60H 3/06* (2006.01)
 *F25D 17/04* (2006.01)

(52) U.S. Cl.
 CPC ...................................... *F25D 17/04* (2013.01)

(58) Field of Classification Search
 USPC .............................. 62/407–410; 454/156–161
 See application file for complete search history.

(56) References Cited

U.S. PATENT DOCUMENTS

| | | | | |
|---|---|---|---|---|
| 2,182,716 | A * | 12/1939 | Brent | 454/145 |
| 6,386,281 | B1 * | 5/2002 | Ganesh et al. | 165/298 |
| 6,419,006 | B1 * | 7/2002 | Loup et al. | 165/42 |
| 6,609,389 | B2 * | 8/2003 | Ozeki et al. | 62/244 |
| 2002/0104324 | A1 * | 8/2002 | Homan et al. | 62/176.2 |
| 2004/0211552 | A1 * | 10/2004 | Seki | 165/202 |
| 2007/0077879 | A1 * | 4/2007 | Marshall et al. | 454/121 |
| 2007/0128999 | A1 * | 6/2007 | Komowski | 454/155 |
| 2007/0232215 | A1 * | 10/2007 | Mateus | 454/107 |
| 2009/0242167 | A1 * | 10/2009 | Onda et al. | 165/61 |

* cited by examiner

*Primary Examiner* — Frantz Jules
*Assistant Examiner* — Steve Tanenbaum
(74) *Attorney, Agent, or Firm* — Harness, Dickey & Pierce, P.L.C.

(57) ABSTRACT

An air conditioning apparatus has, a first domed door comprising a first pivot and a first sealing surface, and a second domed door comprising a second pivot and a second sealing surface, wherein, said second pivot is positioned different from said second pivot. With the above structure, the radial gap between the first sealing surface and the second sealing surface is varied when at least one of the two domed doors is moved. Accordingly, the air conditioning apparatus described above does not have to set the constant small radial gap or constant wide radial gap for the sake of reducing unintentional air leaking or preventing said friction.

15 Claims, 13 Drawing Sheets

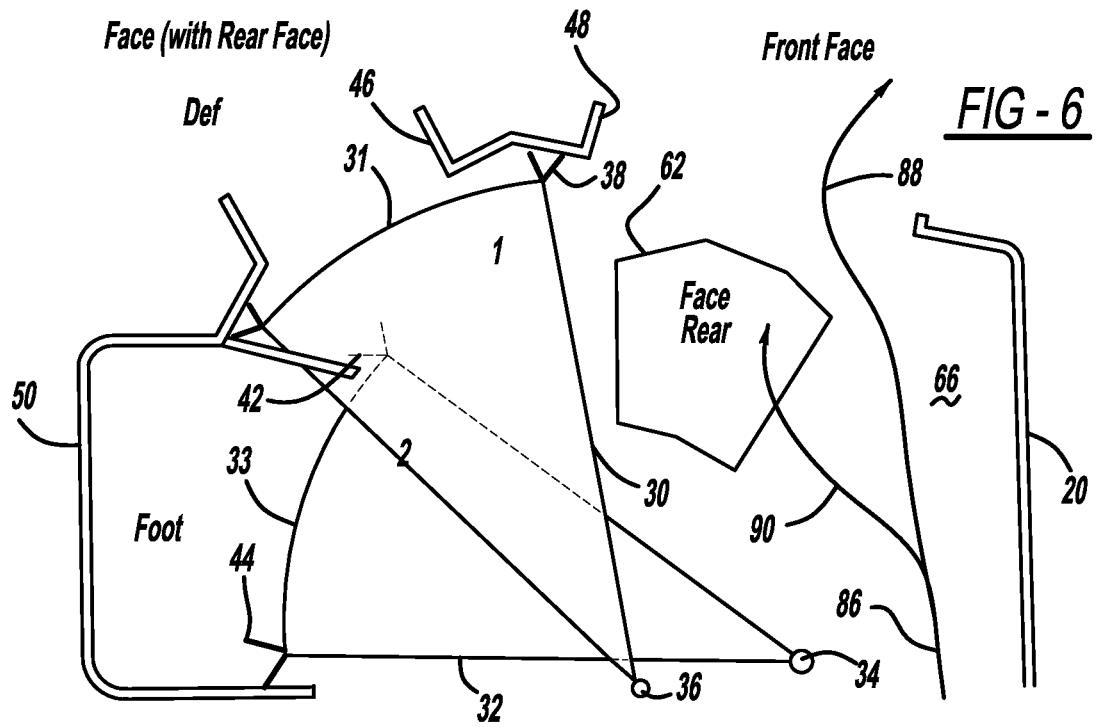
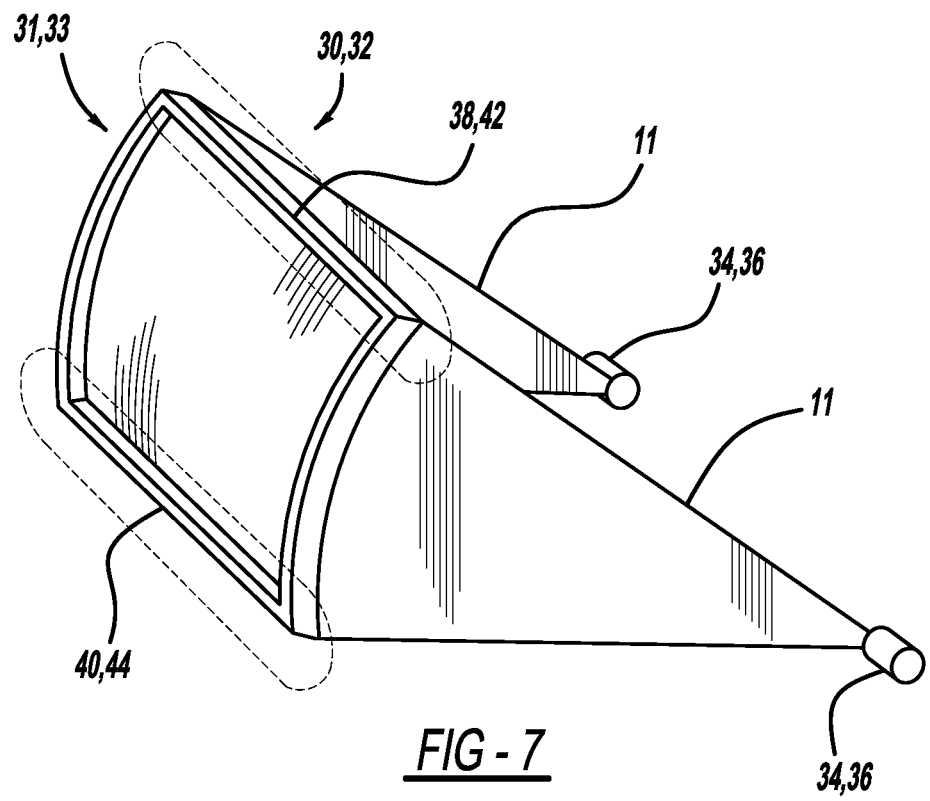

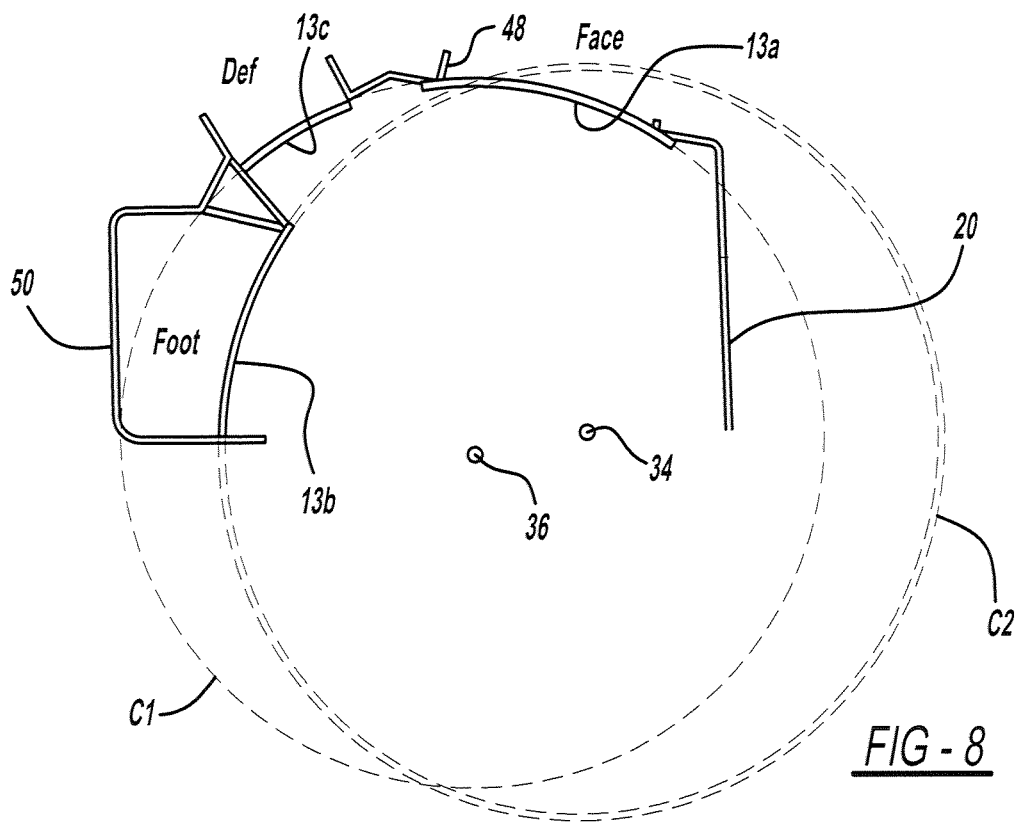
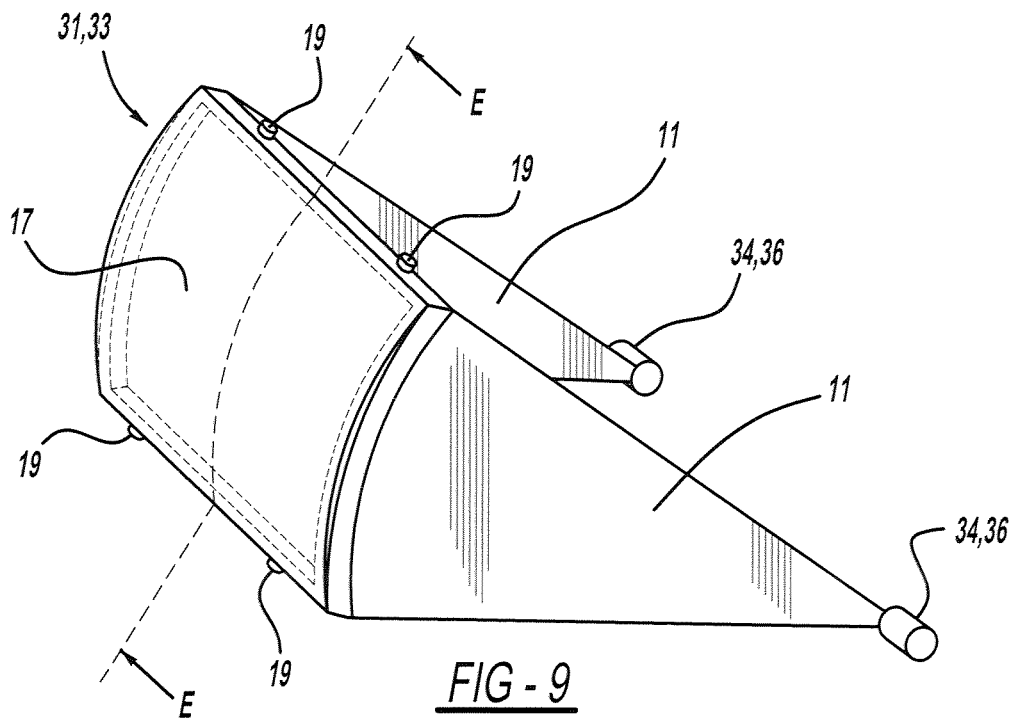

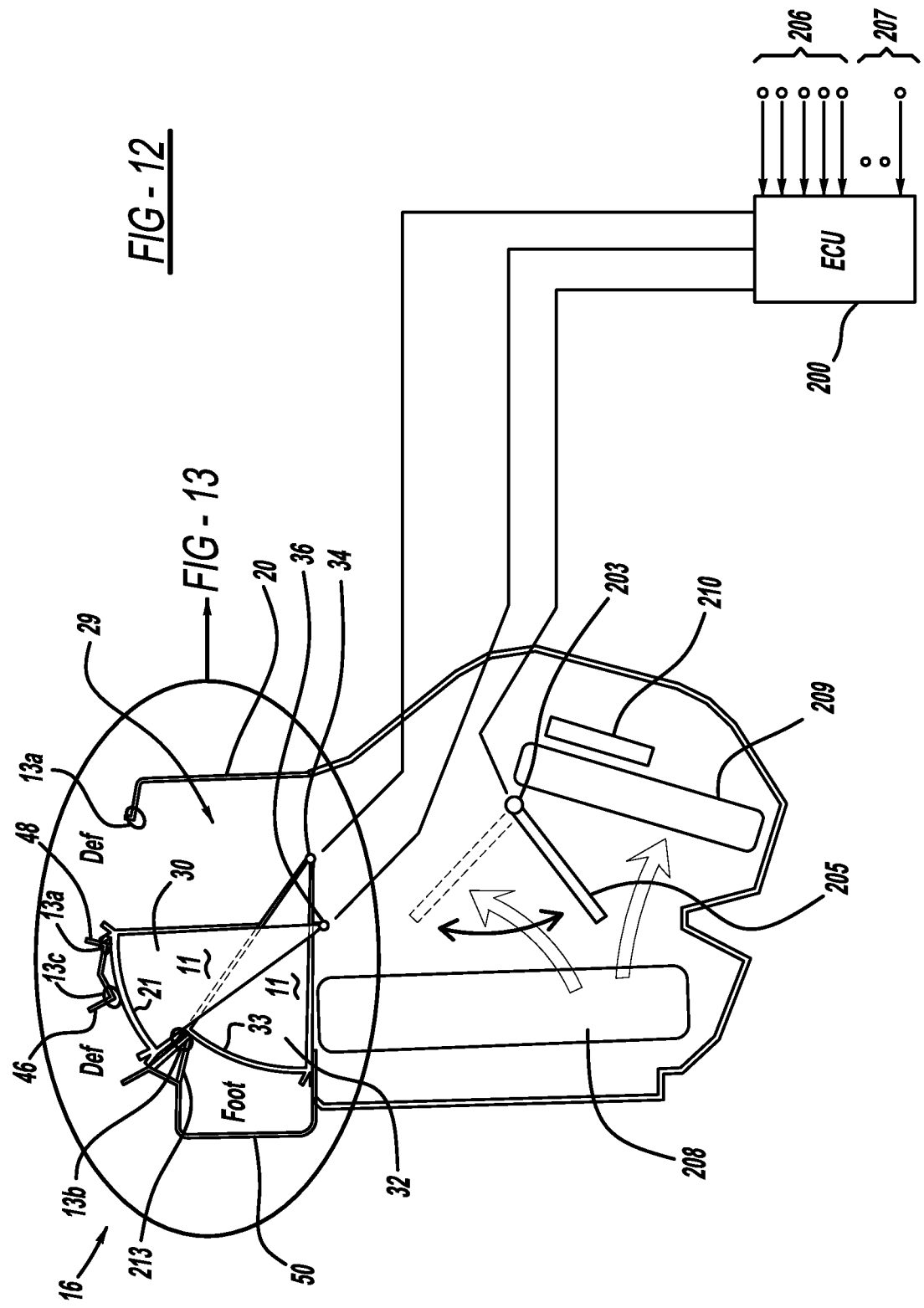

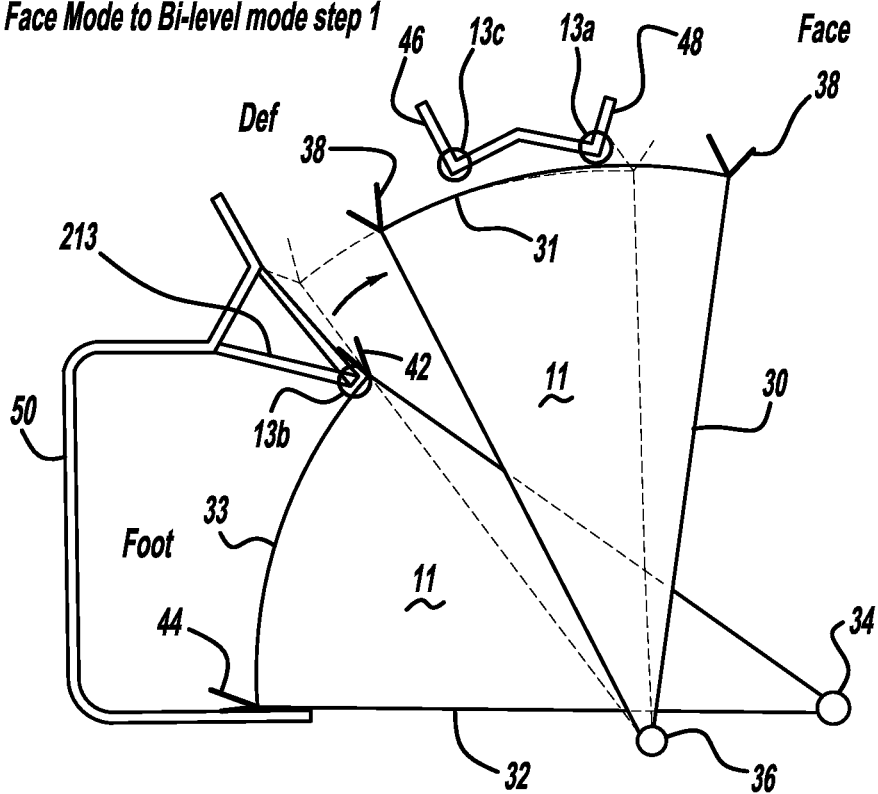
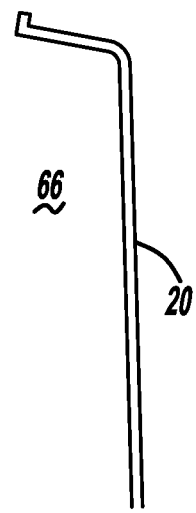
FIG - 14
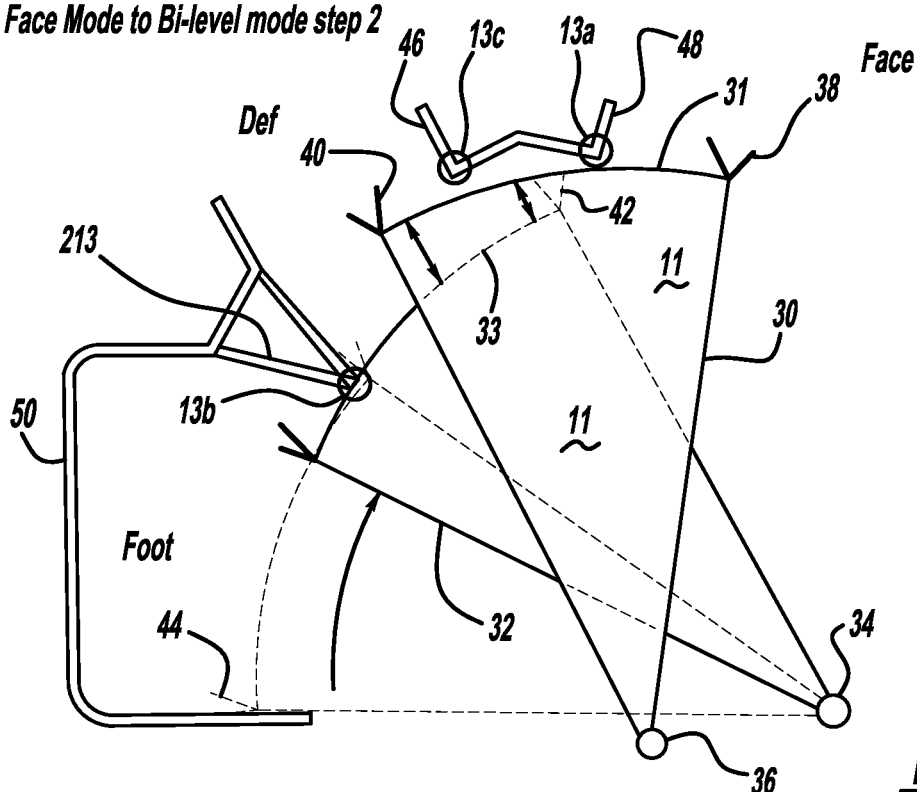
FIG - 15

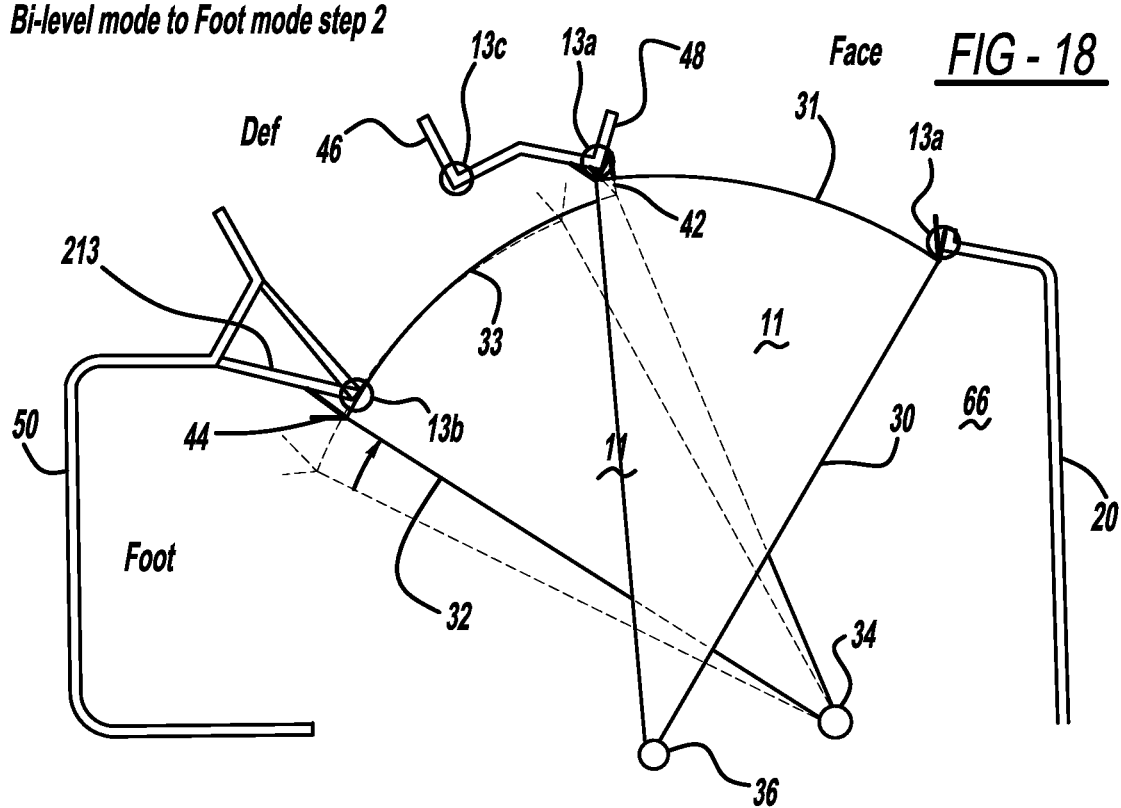
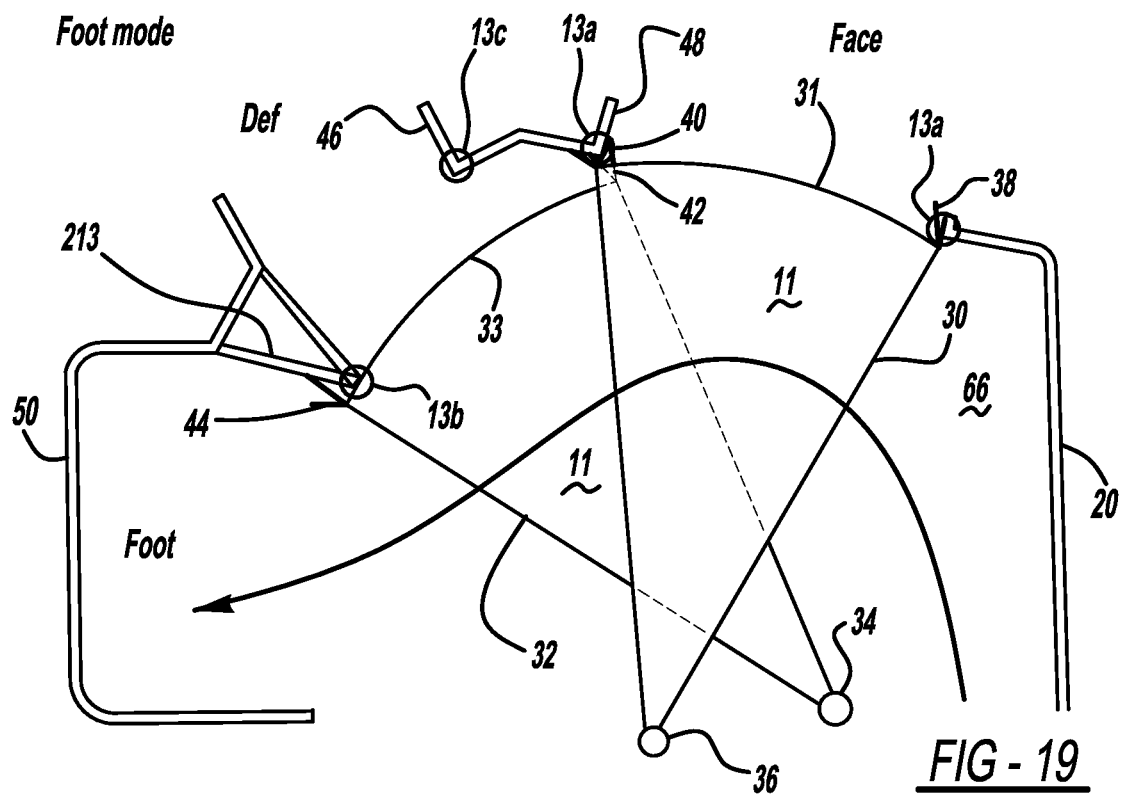

AIR CONDITIONING APPARATUS

CROSS-REFERENCE TO RELATED APPLICATIONS

This application claims the benefit of U.S. Provisional Application No. (61/319,805) filed on (Mar. 31, 2010). The entire disclosure of the above application is incorporated herein by reference.

FIELD

The present disclosure relates to an air conditioning apparatus.

BACKGROUND

This section provides background information related to the present disclosure which is not necessarily prior art. In referring to the drawings, FIG. 23 depicts a cross-sectional perspective view of a mode selecting device 110. The mode selecting device 110 is a part of heating ventilating air conditioning unit (HVAC unit). The HVAC unit composes an air conditioning apparatus for a vehicle. FIG. 24 depicts a cross-sectional perspective and exploded view of said mode selecting device 110 depicted in FIG. 23.

The mode selecting device 110 has air conditioning case 111, inner domed door 112 and outer domed door 113. The air conditioning case 111 is provided with face opening 114, defroster opening 115, and foot opening (not shown). The air, having passed through the HVAC unit, will blow into the passenger compartment of the vehicle via said openings. The inner domed door 112 and the outer domed door 113 each have a pivot axis and a sealing surface. The position of the pivot axis of inner domed door 112 is the same position of the pivot axis of the outer domed door 113.

The inner domed door 112 and the outer domed door 113 can move separately to close the openings by means of an actuator (not shown). The mode selecting device 110 provides for a plurality of air distribution modes of the HVAC unit by adjusting the positions of the two domed doors 112, 113.

Although the above mode selecting device 110 has proven satisfactory for its intended purpose, there is still need for more improvement. For example, to reduce unintentional air leaking from the radial gap between the two sealing surfaces, it is preferable to set the radial gap as small as possible. However, setting the radial gap small may cause friction between the two domed doors 112, 113. Such friction makes noise and vibration.

SUMMARY

In order to overcome the deficiencies in the prior art, the present invention describes an air conditioning apparatus having a plurality of domed doors for controlling airflow comprising, a first domed door having a first pivot axis, a first sealing surface, and a first arm portion between the first pivot axis and the first sealing surface, a second domed door having a second pivot axis, a second seal surface, and a second arm portion between the second pivot axis and the sealing surface, and an air conditioning case accommodating the first domed door and the second domed door, wherein, said first pivot axis is positioned offset against the second pivot axis, said first domed door and said second domed door each can rotate relatively, and said second domed door is at least partially nested in the first domed door. With the above structure, the radial gap between the first sealing surface and the second sealing surface is varied when at least one of the two domed doors is moved. Accordingly, the air conditioning apparatus described above does not have to set the constant small radial gap or constant wide radial gap for the sake of reducing unintentional air leaking or preventing said friction.

In another aspect of this disclosure, a rotation edge of the second sealing surface contacts the first domed door. With such a structure, the radial gap is eliminated.

In another aspect of this disclosure, said second sealing surface has a seal member in the one of said rotation edges, and the seal member contacts the first domed door. With such a structure, the unintentional air leaking is further reduced.

In another aspect of this disclosure, the air conditioning case defines an opening, the first sealing surface contacts the air conditioning case in one side of the opening, the second sealing surface contacts the air conditioning case in the other side of the opening, and the second domed door contacts the first domed door. With the above structure, the first sealing surface and the second sealing surface covers the opening defined by the air conditioning case together.

In another aspect of this disclosure, an air conditioning apparatus further comprising, a controller for driving the first domed door and the second domed door, wherein, the said controller starts moving the first domed door and the second domed door in different timing. With such a structure, the controller can drive two domed doors smoothly.

In another aspect of this disclosure, said controller starts moving the second domed door while the first domed door is still moving. With such a structure, the controller can finish moving two doors quickly.

In another aspect of this disclosure, an air conditioning apparatus comprising, an air conditioning case defining a face opening and a foot opening, a first domed door having a first pivot axis, a first sealing surface and a first arm portion between the first pivot axis and the first sealing surface, a second domed door having a second pivot axis, a second sealing surface, and second arm portion between the second pivot axis and the second sealing surface, wherein, said first pivot axis is positioned offset against the second pivot axis, said second domed door is at least partially nested in the first domed door, said face opening is surrounded by a first contact portion provided in the air conditioning case, the first sealing surface contacts the first contact portion, the foot opening is surrounded by a second contact portion provided in the air conditioning case, the second sealing surface contacts the second contact portion, the first contact portion is at least partially set along the first circle, a center of the first circle is the same as the first pivot axis, the second contact portion is at least partially set along the second circle, a center of the second circle is the same as the second pivot and said second domed door is at least partially nested in the first domed door. With the above structure, the radial gap between the first sealing surface and the second sealing surface is varied when at least one of the two domed doors is moved. Accordingly, the air conditioning apparatus described above does not have to set the constant small radial gap or constant wide radial gap for the sake of reducing unintentional air leaking or preventing said friction. Also, the face opening and the foot opening are closed by the contact of the respective sealing surface and contact portion.

In another aspect of this disclosure, the air conditioning case further defines a defrost opening disposed between the face opening and the foot opening; the defrost opening is closed by both the first domed door and the second domed door.

In another aspect of this disclosure, the first pivot axis is disposed near the foot opening relative to the second pivot axis, the second pivot axis is disposed near the face opening relative to the first pivot axis. With such a structure, the arm portions can be relatively longer. Such longer arm portions allow sealing surfaces to move faster than a shorter arm portion.

In another aspect of this disclosure, the air conditioning case further defines second row passenger opening disposed on a side wall of the air conditioning case, and the second row passenger opening is closed by the first arm portion.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a side sectional view of the air conditioning case illustrated in FIG. 1;

FIG. 7 is an example of domed door in accordance with the present disclosure;

FIG. 8 is a sectional view of the air conditioning case in accordance with the first embodiment of the present disclosure, showing the contact portions provided in the air conditioning case;

FIG. 9 is an example of domed door in accordance with another embodiment;

FIG. 12 is a cross-sectional view taken along line D of the air conditioning apparatus illustrated in FIG. 11;

FIG. 14 is a sectional view of the air conditioning apparatus depicting intermediate position between face air mode and Bi-level air mode;

FIG. 15 is a sectional view of the air conditioning apparatus depicting intermediate position between face air mode and Bi-level air mode;

FIG. 18 is a sectional view of the air conditioning apparatus depicting intermediate position between Bi-level air mode and foot mode;

FIG. 19 is a sectional view of the air conditioning apparatus depicting foot mode;

Corresponding reference numerals indicate corresponding elements throughout the several views of the drawings.

DETAILED DESCRIPTION

The preferred and other embodiments will now be described more fully with reference to FIGS. 1-22 of the accompanying drawings. FIG. 1-8 show the first embodiment.

Figure 1:
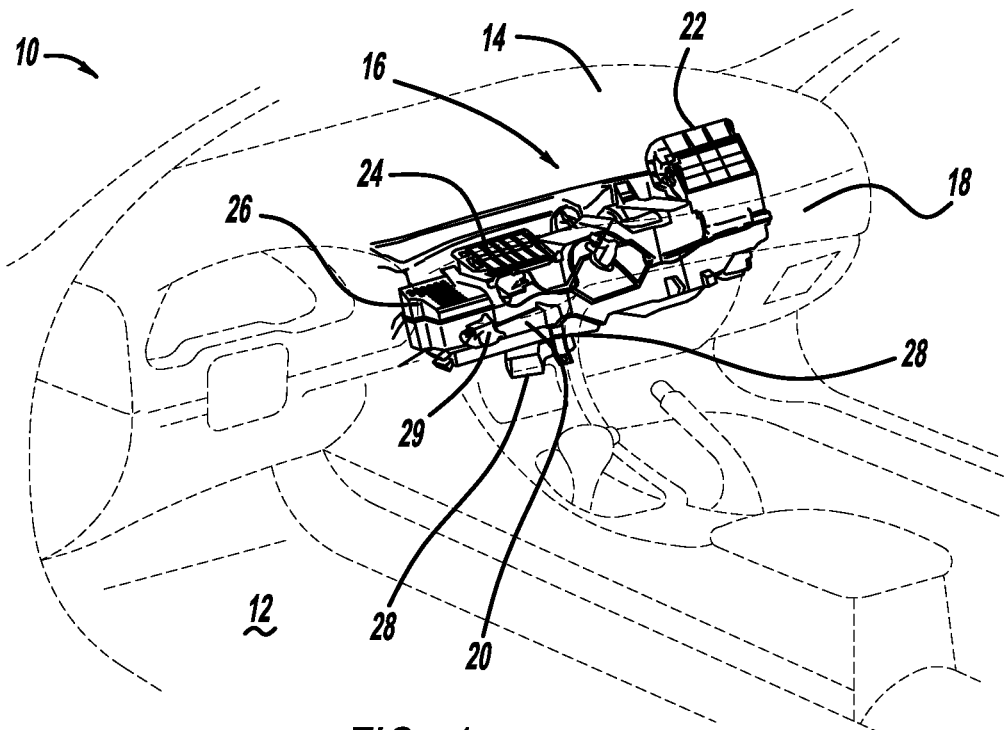
FIG. 1 is a perspective view of an air conditioning unit in accordance with the present disclosure disposed in a front portion of a passenger compartment of a vehicle.

FIG. 1 is a partial perspective view depicting an interior of a vehicle 10 having a passenger compartment 12, a dashboard 14 and an air conditioning unit 16. Air conditioning unit 16 is disposed behind dashboard 14 at approximately the center of passenger compartment 12 in a side-to-side orientation. Air conditioning unit 16 may further include a blower assembly 18 and an air conditioning case 20. Air conditioning case 20 houses an evaporator or cooling providing heat exchanger of a refrigeration system, a heater core or heat providing heat exchanger of a heating system, temperature adjusting mechanisms and air blowing mode selecting mechanisms.

Air conditioning unit 16 is part of a more comprehensive air conditioning system which may further include a refrigerant compressor (not shown), a condenser (not shown), an expansion device (not shown) and an evaporator. Air conditioning unit 16 is also part of a vehicle heating system which includes the vehicle's engine (not shown), a water pump (not shown), a radiator (not shown) and a heating heat exchanger. Air conditioning unit 16 may further employ an air intake mechanism 22, a defroster duct 24, face duct 26, foot duct 28, and an air outlet mode selecting device 29. Air intake mechanism 22 may be configured to select the ratio between inside air and outside air provided to blower assembly 18. An inside/outside air switching door mechanism may adjust the ratio between inside air and outside air.

Figure 2:
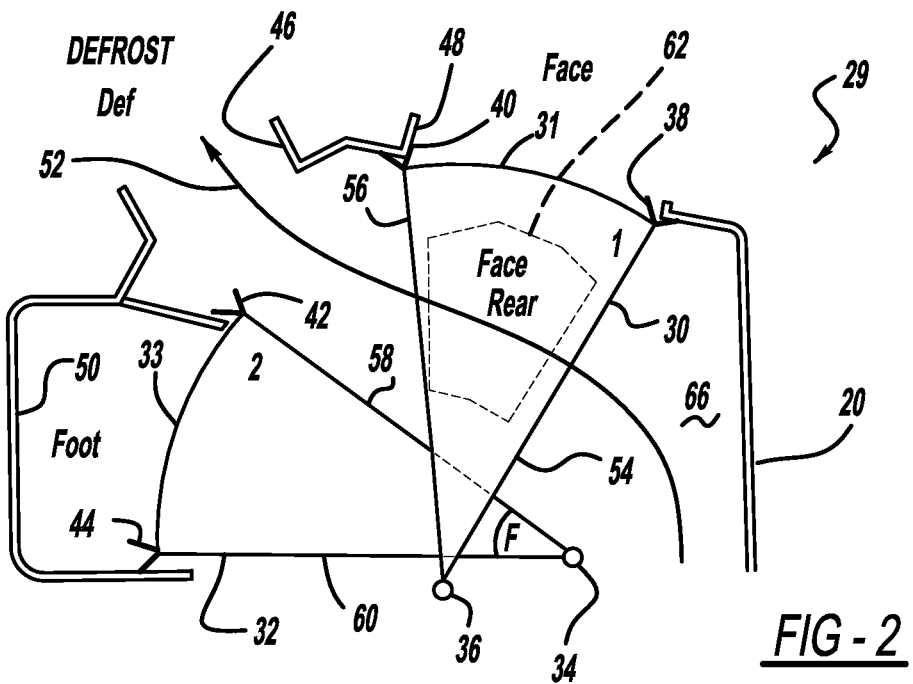
FIG. 2 is a side sectional view of the air conditioning case constituting defroster mode.

Continuing with FIG. 2, the air conditioning case 20 has a face opening 48 corresponding to the face duct 26, a defroster opening 46 corresponding to the defroster duct 24 and a foot opening 50 corresponding to the foot duct 28. The air blowing mode selecting device 29 has two domed doors. The first domed door 30 corresponds to the face opening 48 and defroster opening 46. The second domed door 32 corresponds to the foot opening 50 and defroster opening 46. First domed door 30 and second domed door 32 are mode doors. FIG. 7 shows an example of domed door. The first domed door 30 and the second domed door 32 may pivot about or rotate about its pivot axis 34, 36. The first domed door 30 and the second domed door 32 are further equipped with an end surface 31, 33. In this embodiment, the end surfaces 31, 33 are curved surfaces. The curved end surfaces 31, 33 have seal members 38, 40, 42, 44 such as rubber seals. The seal members 38, 40, 42, 44 are disposed along the rectangular edge of the end surfaces 31, 33. More specifically, the seal members 38, 40, 42, 44 are at least disposed in the edges in the rotation orientation of the end surfaces 31, 33. The edges in the rotation orientation are indicated by dashed line in FIG. 7.

The domed doors 30, 32 each have two arm portions 11. In this embodiment, the arm portions 11 are pie-shaped plate. The pie-shaped plate has two equal length sides, and the angle between the two equal length sides is acute angle F. The arm portions 11 are each disposed between the end surface 31, 33 and the pivot axis 34, 36 to support the end surface 31, 33.

In addition, in the sectional view, the first pivot axis 36 is disposed near the foot opening 50 relative to the second pivot axis 34, the second pivot axis 34 is disposed near the face opening 48 relative to the first pivot axis 36. With the above structure, the arm portions 11 can be relatively longer. Such longer arm portions 11 allow end surfaces 31, 33 to move faster than a shorter arm portion 11. Moreover, domed doors 30, 32 may "nest" with each other; that is, the first domed door 30 may be pivotable to move within the second domed door 32, or the second domed door 32 may be pivotable to nest within the first domed door 30.

When the domed doors 30, 32 are adjusted into specific positions, the seal members 38, 40, 42, 44 will contact respective contact portions 13a, 13b, 13c (depicted in FIG. 8) of the air conditioning case 20 or the other domed door's sealing surface to prevent air from exiting specific air openings. In this embodiment, the seal members 38, 40, 42, 44 are made of rubber, but using other materials for seal members 38, 40, 42, 44 is possible.

To permit airflow to flow to specific openings, as will be further explained below, domed doors 30, 32 have a "C" shape structure composed by the end surface 31, 33 and arm portions 11 in this embodiment. Of course in another embodiment, the domed doors may have holes or other mesh or frame structure to permit air to pass from one side of a door to another side of the same door.

Figure 10:
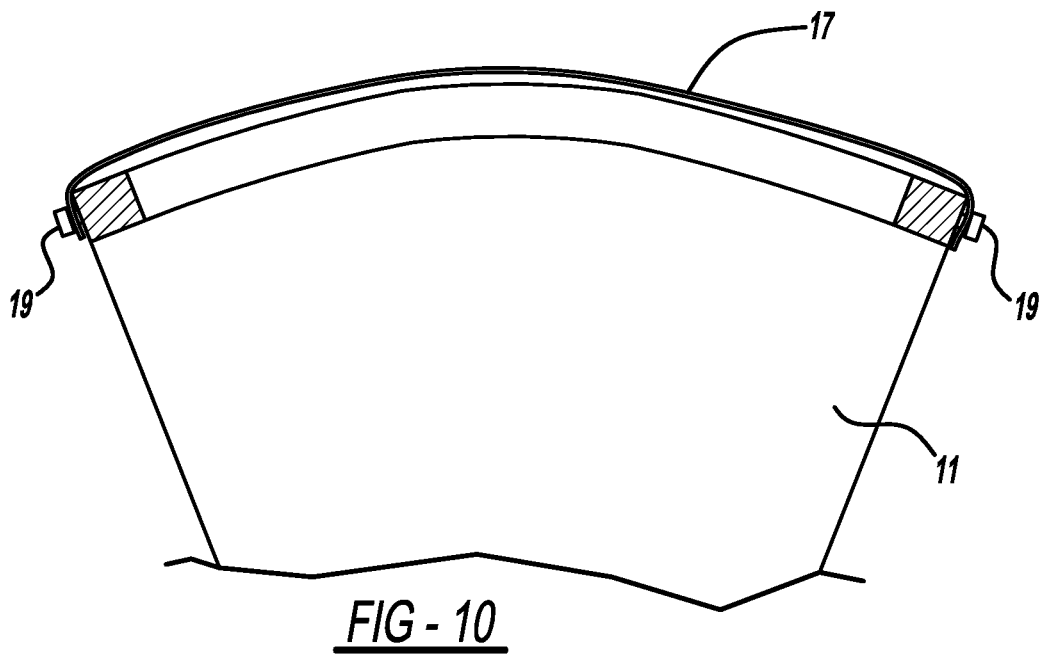
FIG. 10 is a part of a sectional view of the domed door depicted in FIG. 9 taken along dashed line E.

FIG. 9 and FIG. 10 depict another embodiment. FIG. 10 shows a cross-sectional view of the domed door depicted in FIG. 9 taken along line E. The end surfaces 31, 33 have a frame structure 15 and a sail member 17. The sail member 17 fixed to the frame structure 15 by means for fixing 19, and covers the frame structure 15. The means for fixing 19 allows relative movement between the frame structure 15 and the sail member 17. Consequently, the sail member 17 can inflate towards the openings 46, 48, 50 by the airflow pressure, and contact the contact portions 13a, 13b, 13c to seal the openings 46, 48 and 50.

FIG. 8 shows contact portions 13a, 13b, 13c provided in the air conditioning case 20. The first contact portion 13a surrounds about a perimeter of the face opening 48. The second contact portion 13b surrounds about a perimeter of the foot opening 50. The third contact portion 13c surrounds about a perimeter of the defroster opening 46.

The first end surface 31 may contact both the first contact portion 13a and the third contact surface 13c. The second sealing surface 33 contacts the second contact portion 13b. The first contact portion 13a is at least partially set along with the first circle c1. The center of the first circle c1 is the same as the first pivot axis 36. The second contact portion 13b is at least partially set along with the second circle c2. The center of the second circle c2 is the same as the second pivot 34.

In this embodiment, the seal members 38, 40, 42, 44 are disposed on the end surfaces 31, 33 side, but the seal members 38, 40, 42, 44 may be disposed in the contact portions 13a, 13b, 13c side. Turning back to the first embodiment; the FIGS. 2-6 depict various arrangements of the domed doors 30, 32. More specifically, various positions of a first domed door 30 and a second domed door 32 are depicted. In FIG. 2, air openings 46, 48, 50 may be connected to the defroster duct 24, a face duct 26, and a foot duct 28 with each duct leading to a respective opening.

The first pivot axis 36 is positioned to offset against the second pivot axis 34. The FIG. 2 depicts defroster mode in the air blowing mode selecting device. The first domed door 30 is secured over face opening 48. The seal member 38, 40 may contact the first contact portion 13a to prevent airflow from face opening 48. In addition, the second domed door 32 secured over foot opening 50 such that seal member 42, 44 may contact the second contact portion 13b to prevent airflow from foot opening 50, airflow may almost only flow from defroster opening 46. Thus, with reference continuing with FIG. 2, airflow 52 is able to pass from a side 54 to a side 56 of first domed door 30 and from a side 58 to a side 60 of second domed door 32.

FIG. 2 also depicts a rear face outlet 62. The air going into the rear face outlet 62 will be delivered to the second row passenger seat in the vehicle via a rear face duct (not shown). The rear face outlet 62 may be covered or blocked by the arm portion 11 of the first domed door 30. The rear face outlet 62 may be located at a longitudinal end of one of domed doors 30, 32. Depending upon design considerations, such as whether a vehicle is left or right hand drive, rear face outlet 62 may be in a side wall of the air conditioning case 20.

Figure 3:
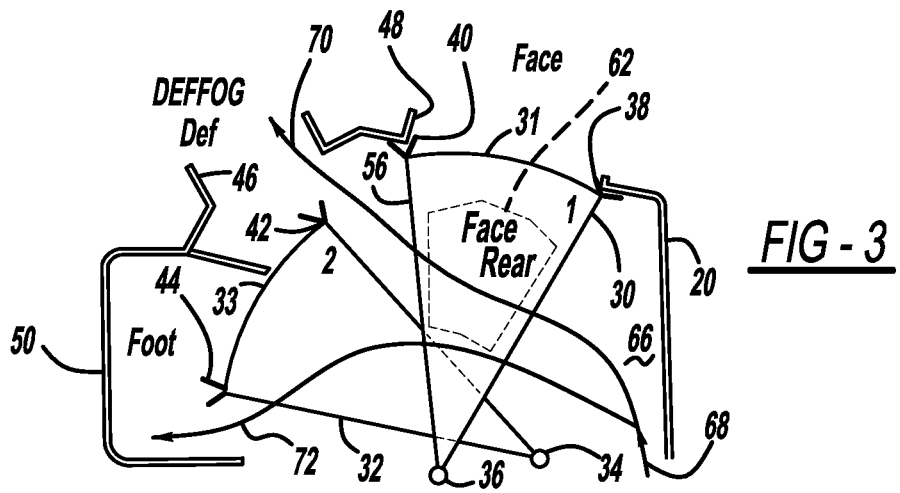
FIG. 3 is a side sectional view of the air conditioning case constituting foot-defroster mode.

Turning to FIG. 3, the FIG. 3 depicts foot-defroster mode in the air blowing mode selecting device. The domed door 30 is depicted such that seal member 38 and seal member 40 are positioned to contact the contact portion 13 of air conditioning case 20 about face opening 48 so that air is prevented from passing from face opening 48. The rear face outlet 62 is covered by the first arm portion 11 to prevent airflow from flowing out of rear face outlet 62. The second domed door 32, on the other hand, will permit air flow 68 to be divided into air flow 72 which will flow through the second domed door 32 to foot opening 50 and air flow 70 which will flow through first domed door 30 to defroster opening 46. The foot opening 50 may be directed toward more than one foot duct 28, as depicted in FIG. 1. The airflow 72, for instance, that flows to foot opening 50 when flowing to multiple foot ducts 28; however, configuring ducting taking into consideration other vehicle structures is within the scope of the present disclosure.

Figure 4:
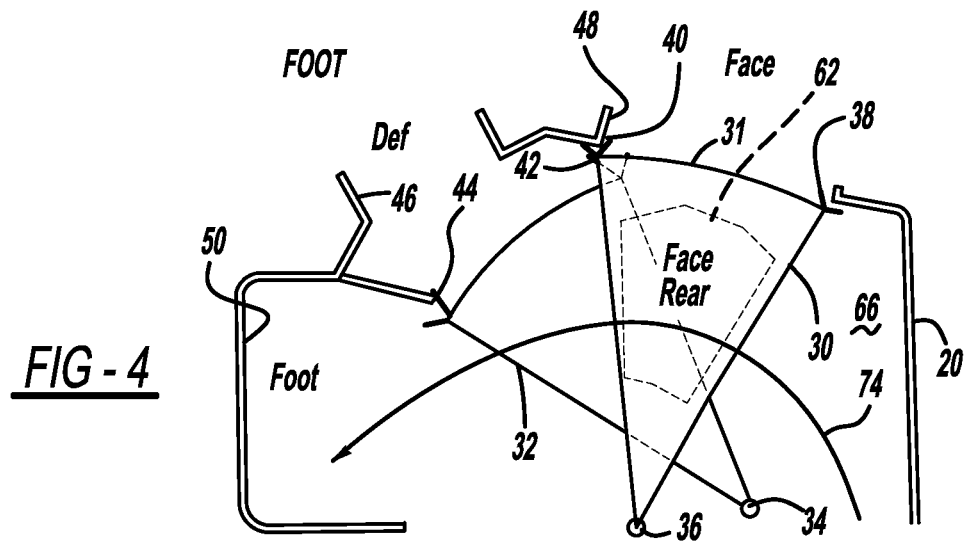
FIG. 4 is a side sectional view of the air conditioning case constituting foot mode.

Turning to FIG. 4, FIG. 4 depicts the foot mode. The first domed door 30 is depicted such that seal member 38 and seal member 40 contacts the contact portion 13 of the air conditioning case 20 about or near a perimeter of the face opening 48, to thereby block air flow from face opening 48. Simultaneously, the second domed door 32 is depicted such that seal member 44 contacts the contact portion 13 of air conditioning case 20 about or near a perimeter of defroster opening 46, seal member 44 contacts end surface 31 of the first domed door 30, and thereby preventing air flow from exiting from defroster opening 46.

Because of such arrangement of domed doors 30, 32, air flow 74 is permitted to flow through domed doors 30, 32 and almost only into foot opening 50, thereby channeling air to one or more foot ducts 28. Again, rear face outlet 62 may be covered to prevent airflow into rear face outlet 62, which may be located in a wall 66 of air conditioning case 20.

FIG. 4 also depicts a partial nested arrangement of the first domed door 30 and the second domed door 32. More specifically, the second domed door 32 may be partially nested within the first domed door 30, or alternatively, the first domed door 30 may be partially nested within the second domed door 32. Even with such nested arrangement, the first domed door 30 and the second domed door 32 may maintain separate pivot points 34, 36.

Figure 5:
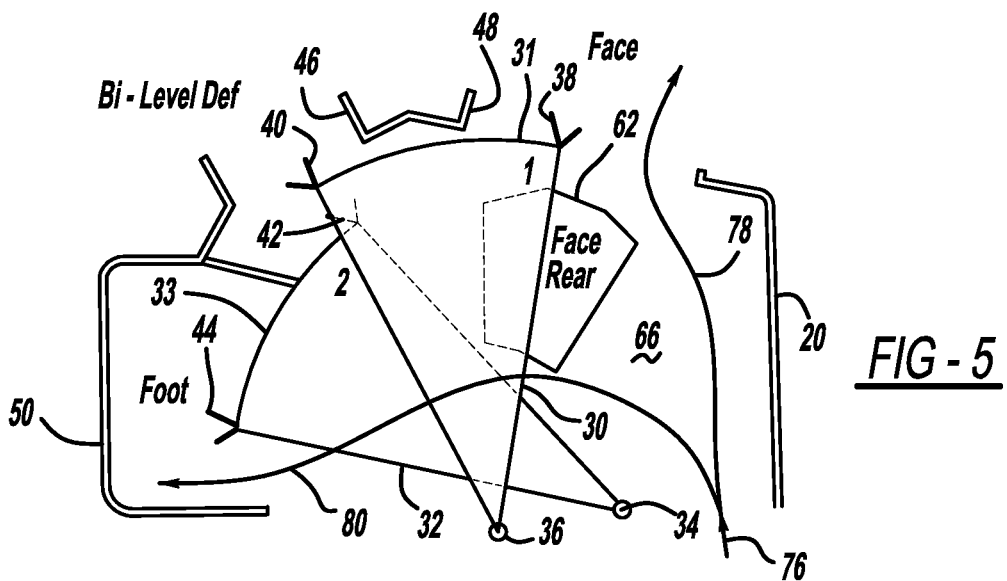
FIG. 5 is a side sectional view of the air conditioning case constituting Bi-level mode.

Turning now to Bi-level air mode depicted with FIG. 5, the first domed door 30 and the second domed door 32 are depicted to permit Bi-level flow of air into passenger compartment 12 (FIG. 1). More specifically, the first domed door 30 is positioned such that only part of face opening 48 is covered and such that only part of defroster opening 46 is covered; however, the second domed door 32 covers the part of defroster opening 46 that the first domed door 30 does not cover. At the same time, the second domed door 32 also permits part of foot opening 50 to accept airflow. Thus, airflow 76 may be divided into airflow 78 that flows from face opening 48 and into airflow 80 that flows into foot opening 50.

In this Bi-level air mode, arm portion of the first domed door 30 covers a part of the rear face outlet 62 to permit airflow from only part of rear face outlet 62. Moreover, in Bi-level air mode, sealing between domed doors 30, 32 may be necessary to prevent air from passing between small spaces between domed doors 30, 32.

Turning now to face air mode depicted with FIG. 6, an arrangement and positioning of domed doors 30, 32 may be such that seal members 38, 40 of the first domed door 30 contact the contact portion 13c on air conditioning case 20 about a periphery of defroster opening 46 to prevent air flow into defroster opening 46. At the same time, the second domed door 32 may be positioned such that seal members 42, 44 contact the contact portion 13b on a periphery of foot opening 50 to prevent airflow into foot opening 50. Thus, with such an arrangement, airflow 86 through air conditioning case 20 is almost only permitted to flow into face opening 48 and rear face outlet 62, which are left uncovered.

Again, with the positioning of the first domed door 30 and the second domed door 32, as depicted in FIG. 6, partial nesting of domed doors 30, 32 may occur. Thus, the first domed door 30 may be nested within the second domed door 32 or the second domed door 32 may be nested within the first domed door 30. With domed doors 30, 32, positioned as depicted in FIG. 6, airflow 86 is almost only permitted to flow from face opening 48 and rear face outlet 62.

FIGS. 11 to 21 show the second embodiment of the present invention, having similar elements as the first embodiment, referred by the same reference numerals. In the first embodiment, the air conditioning case have rear face outlet 62, but in this second embodiment, the air conditioning case 20 does not have rear face outlet 62 or the rear face outlet 62 is covered by a lid.

Figure 11:
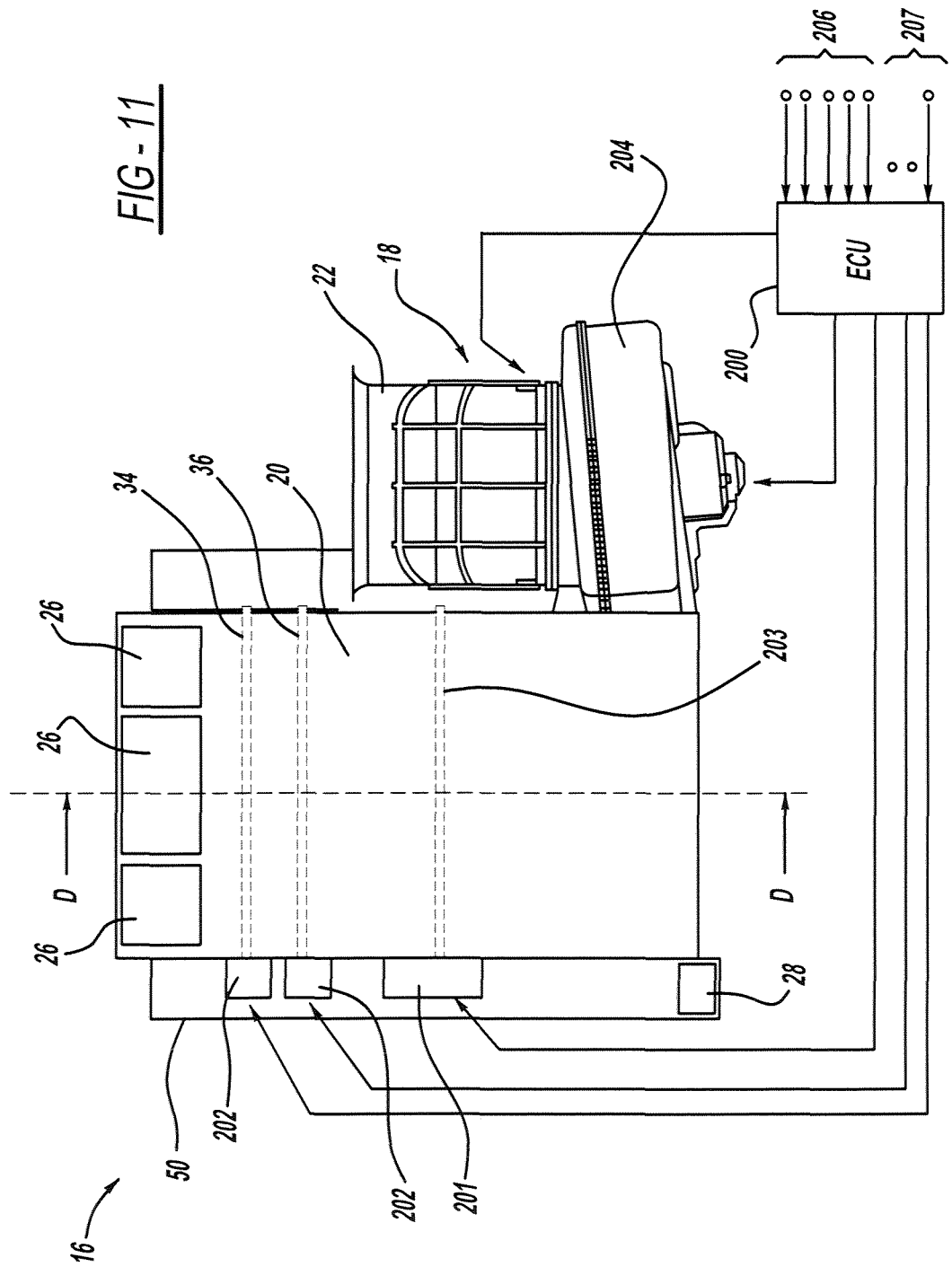
FIG. 11 is a plain view of an air conditioning apparatus according to the second embodiment.

FIG. 11 shows plain view of an air conditioning unit 16 according to the second embodiment. The air conditioning unit 16 has an air conditioning case 20, a blower assembly 18, and a controller 200. The air conditioning case 20 defines an airflow passage. The air conditioning case 20 is a duct member. The airflow passage has a plurality of airflow openings. The airflow openings are face opening 48, foot opening 50, and defroster opening 46 (depicted in FIG. 12) in this embodiment. The upstream end of the airflow passage is connected to the blower assembly 18. Actuators 201, 202 are attached to the side wall of the air conditioning case 20. The actuators control air-mixing door axis 203, a first domed door pivot axis 36, and the second domed door pivot axis 34.

The blower assembly 18 has an air intake mechanism 22 and a blower fan 204. The air intake mechanism 22 introduces either recirculation airflows from vehicle passenger compartment or outside fresh air from outside of the passenger compartment. The blower fan 204 creates airflow blown into said air conditioning case 20. The controller 200 controls the air intake mechanism 22, the blower fan 204, air mixing door 205 (depicted in FIG. 12) and domed doors 30, 32 (depicted in FIG. 12) based on the various information input from the plurality of vehicle sensors 206 or switches 207 in this embodiment. The controller 200 drives said two domed doors 30, 32 respectively, and the controller 200 disposes the two domed doors 30, 32 in several particular rotational angles. The several particular rotational angles each form the one of the predetermined air distribution mode.

FIG. 12 shows a cross-sectional view of the air conditioning unit 16 depicted in FIG. 11 taken along line D. The air conditioning case 20 accommodates an evaporator 208, an air mixing door 205, heater core 209, auxiliary heat exchanger 210, and domed doors 30, 32. The evaporator 208 is a cooling heat exchanger used for cooling air passing through. The air mixing door 205 is an airflow direction switching device. The air mixing door 205 divides airflow passed through the evaporator 208 into two airflows. The one of the two airflows is directed to pass through the heater core 209 and auxiliary heat exchanger 210. The other airflow is directed to the bypass passage 211 to bypass the heater core 209 and the auxiliary heat exchanger 210.

The air mixing door 205 is controlled by the controller 200 based on the target temperature of air outlet (TAO). The TAO is calculated by the controller 200 based on the thermal loads. The heater core 209 and the auxiliary heat exchanger 210 are heat providing heat exchangers. The auxiliary heat exchanger 210 may be an electrical heater, gas heater or heat radiating device for other heating equipment in the vehicle.

The domed doors 30, 32 composes outlet mode selecting device 29. The domed doors further comprise pivots 34, 36 and end surfaces 31, 33. The end surfaces 31, 33 are connected to the respective pivots 34, 36 by the arm portion 11. The pivots 34, 36 are positioned different form each other. In this embodiment, the arm portions 11 are pie shaped in cross-sectional view. Also, the arm portions 11 may be symmetrical or asymmetrical in cross-sectional view. The two domed doors 30, 32 are controlled and disposed in the specific positions by the controller 200 to compose one of predetermined air distribution modes. One of the two domed doors may be nested in the other domed door. In this embodiment, the nested domed door is called inner domed door 32, and the other domed door is called outer domed door 30.

The air conditioning case 20 defines contact portions 13a, 13b, and 13c. The, contact portions 13a, 13b, and 13c each surround respective airflow opening 46, 48, 50. The contact portions 13a, 13b, and 13c are along the end surfaces 31, 33. In other words, the contact portions 13a, 13b, and 13c are aligned along trails (dashed line A and B depicted in FIG. 13) of the end surfaces 31, 33. The trails correspond to the circle c1 and c2 depicted in FIG. 8.

Figure 13:
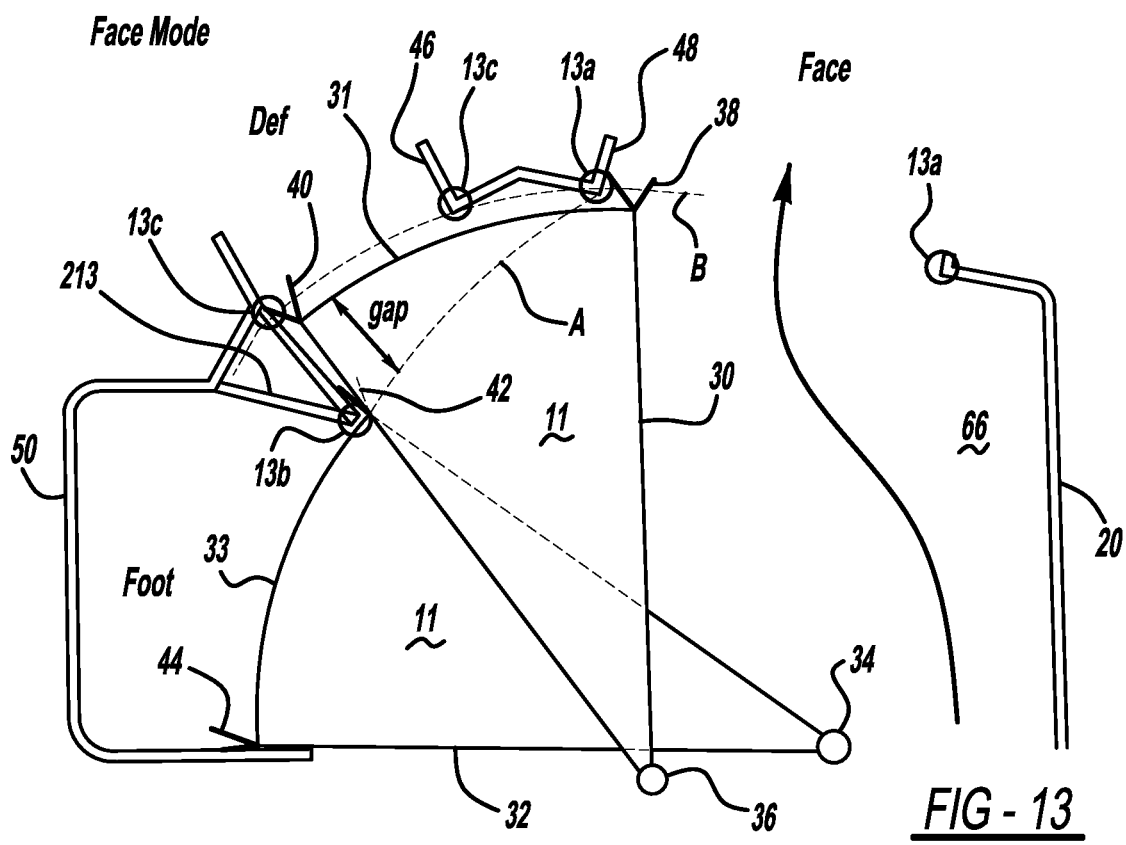
FIG. 13 is an enlarged view of FIG. 12 depicting face air mode.

FIG. 13 shows enlarged view of FIG. 12. FIG. 13 depicts the positions of domed doors 30, 32 composing face air mode. In the face air mode, the defroster opening 46 and foot opening 50 are closed by the two domed doors 30, 32. The defroster opening 46 is closed by the outer domed door 30. The air conditioned airflow mainly blown into the face opening 48. The seal members 40, 38 of the outer domed door 30 are contacting the contact portion 13c on the inner surface of the air conditioning case 20. The foot opening is closed by the inner domed door 32. The seal members 42, 44 of the inner domed door 32 are contacting the contact portion 13b on the inner surface of the air conditioning case 20. In this face air mode domed door layout, there is a radial gap between the outer domed door's end surface 31 and inner domed door's sealing surface 33. The radial gap is sealed by the protrusion 213 of the air conditioning case 20. In other words, the duct member provides a protrusion 213 for filling said radial gap.

FIG. 14 and FIG. 15 show intermediate state between Bi-level air mode and face air mode. The controller 200 at first drives the outer domed door 30 to inter mediate portion of the face opening 48 and the defroster opening 46. Then the controller 200 drives inner domed door 32 to open the foot outlets (FIG. 15). The seal member 42 of the inner domed door 32 contact the inside surface of the outer domed door's end surface 31. In other words, when the controller 200 drives both the two domed doors 30, 32 to change the air distribution modes, the controller 200 starts moving one of the two domed doors 30, 32 alone, and then, the controller 200 allows the other one of the domed doors 30, 32 to start. Therefore, the controller 200 starts moving the first domed door 30 and the second domed door 32 in different timing. Furthermore, the controller 200 starts moving the inner domed door 32, while the outer domed door 30 is still moving. With the above structure, the controller 200 can drive two domed doors smoothly and quickly.

The gap between outer domed door's end surface 31 and inner domed door's sealing surface 33 varies when the relative position of the outer domed door 30 and the inner domed door 32 differs. The double headed arrows in FIG. 15 indicate the gap. Because of the different positions of the two domed doors respective pivots 36, 34, the gap becomes smaller when the inner domed door 32 moves to towards the outer domed door 30. A pair of rotational angles, which provides the least gap or contact, would compose the face air mode in this embodiment.

Figure 16:
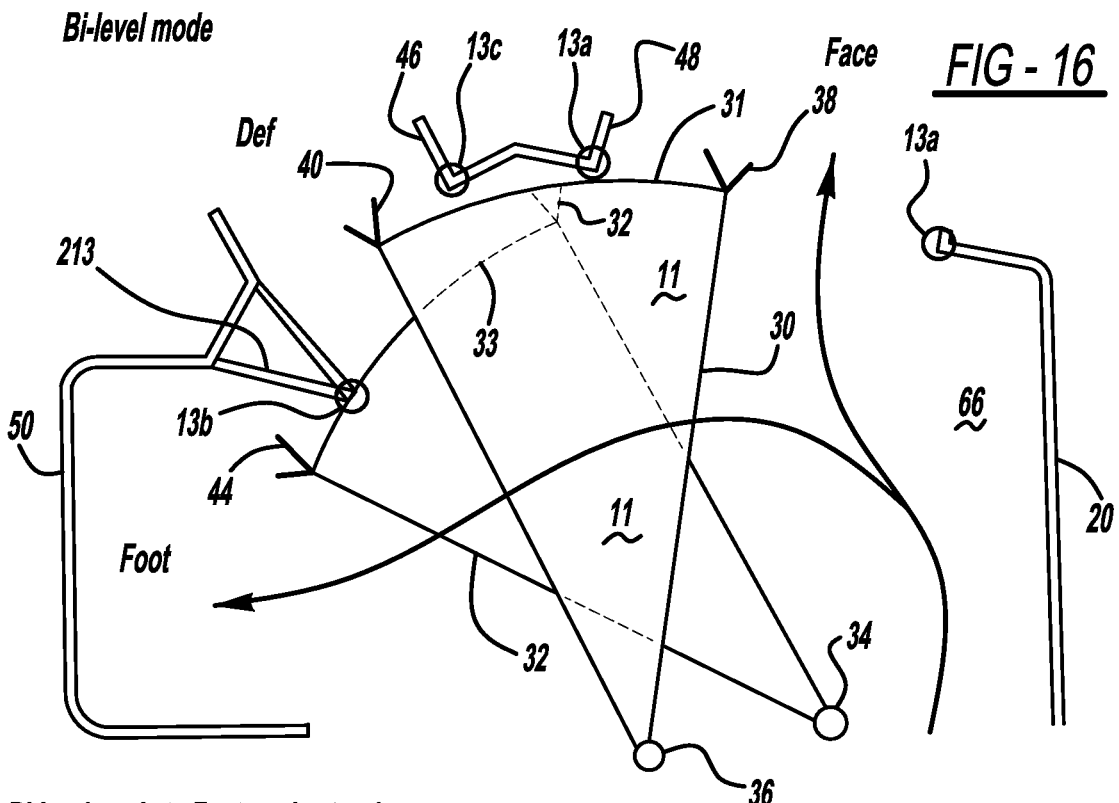
FIG. 16 is a sectional view of the air conditioning apparatus depicting Bi-level air mode.

FIG. 16 shows Bi-level air mode position. The face opening 46 and the foot opening 48 opened half way. The temperature conditioned airflow divided in two airflows, and go into face opening 48 and foot opening 50.

Figure 17:
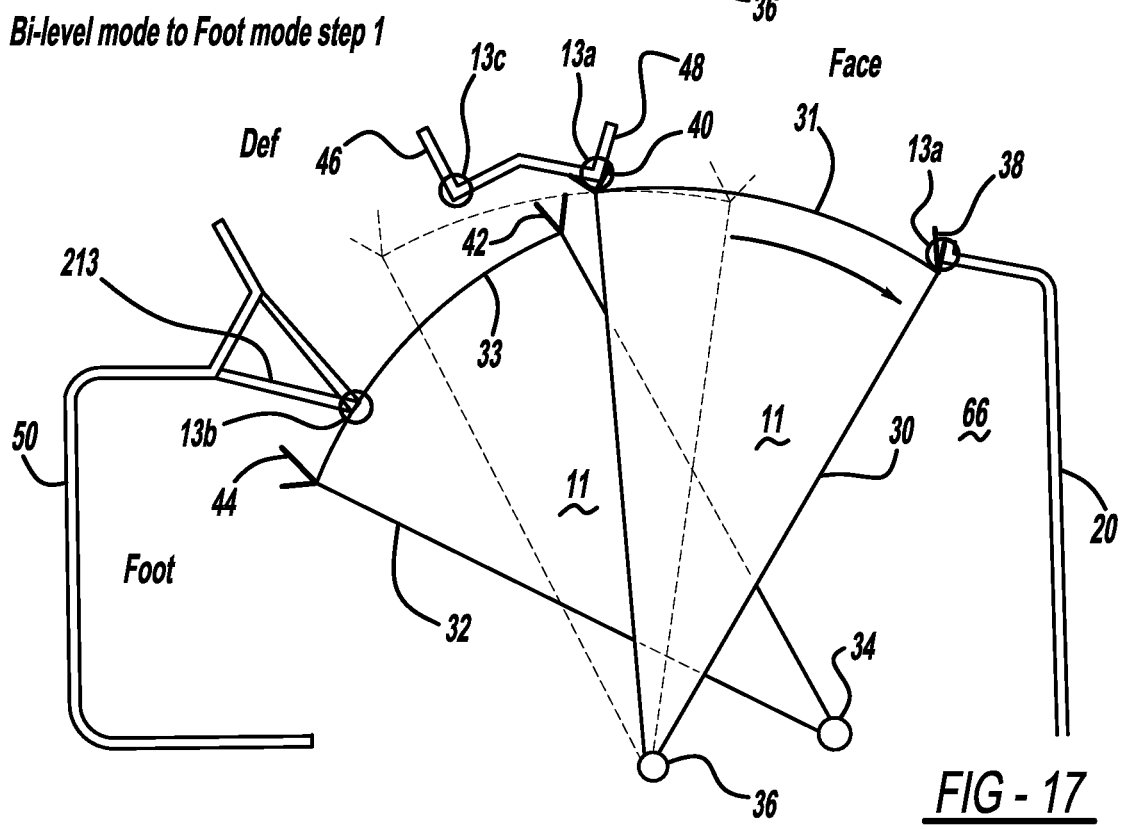
FIG. 17 is a sectional view of the air conditioning apparatus depicting intermediate position between Bi-level air mode and foot mode.

FIG. 17 and FIG. 18 show the intermediate state between the Bi-level air mode and the foot mode. The controller 200 drives outer domed door 30 in clock-wise direction to close the face opening 48. The dashed line depicted in FIG. 16 shows the position of the outer domed door 30 in Bi-level air mode. Then the controller 200 closes the defroster opening 46 by moving the inner domed door 32 in clock-wise direction (FIG. 18). The seal member 40 disposed in the rotation edge of the inner domed door's sealing surface 33 contacts to the inner surface of the outer domed door's end surface 31. The dashed line depicted in FIG. 18 shows the position of the inner domed door 32 in the Bi-level air mode.

FIG. 19 shows a foot mode. The temperature controlled airflow goes into the foot opening 50. The seal members 40, 38 of the outer domed door 30 are contacting the contact portion 13a on the inner surface of the air conditioning case 20. The seal member 44 of the inner domed door 32 is contacting the contact portion 13b on the top of the protrusion 213. The seal member 42 of the inner domed door 32 is contacting the inner surface of the outer end surface 31.

Figure 20:
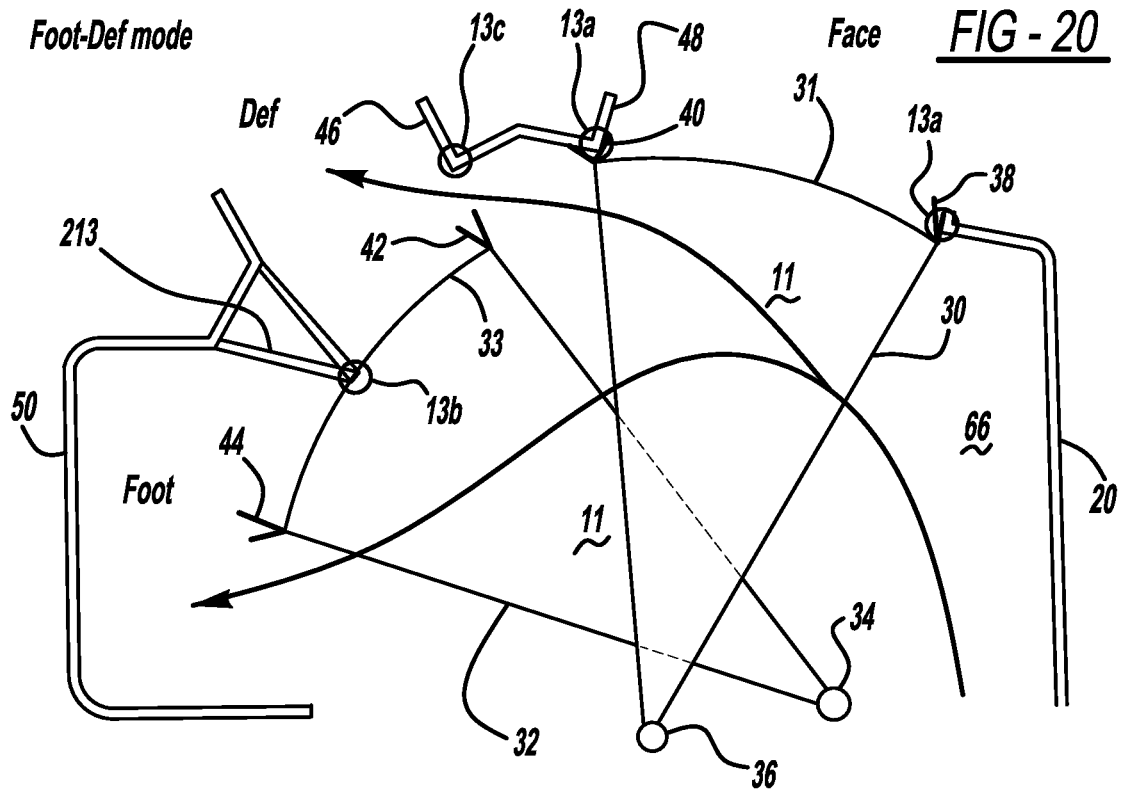
FIG. 20 is a sectional view of the air conditioning apparatus depicting Foot-defroster mode.

FIG. 20 shows Foot-Def mode. The temperature controlled airflow is divided into two airflows. The airflow is blown into the foot opening 50 and defroster opening 46. The seal members 40, 38 of the outer domed door 30 are contacting the contact portion 13a on the inner surface of the air conditioning case 20. The contact portion 13b provided on the top of the triangle shape protrusion 213 may briefly contacts the inner sealing surface 33.

Figure 21:
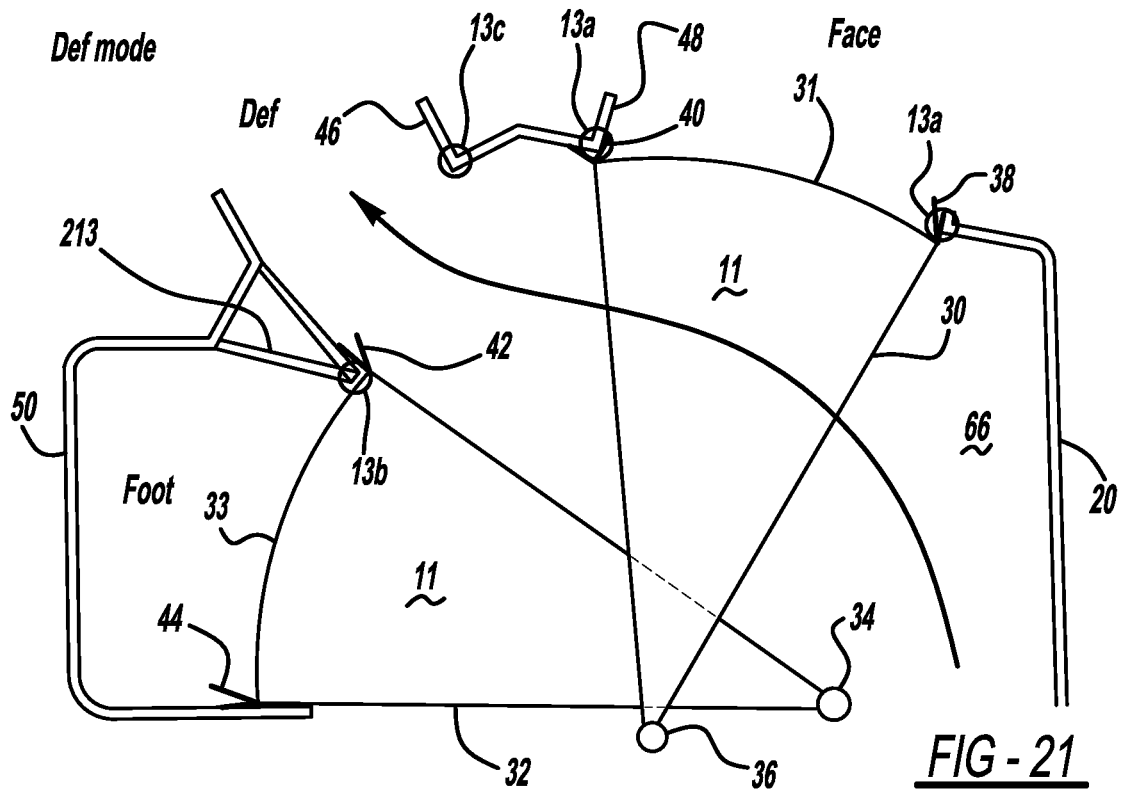
FIG. 21 is a sectional view of the air conditioning apparatus depicting defroster mode.

FIG. 21 shows defroster mode. The face opening 48 is closed by the outer domed door 30. The foot opening 50 is closed by the inner domed door 32. The seal members 40, 38 of the outer domed door 30 are contacting the contact portion 13a on the inner surface of the air conditioning case 20. The seal member 42 of the inner domed door 32 is contacting the contact portion 13b on the top of the triangle shape protrusion 213. The seal member 44 of the inner domed door 32 is contacting the contact portion 13b of the air conditioning case 20.

Figure 22:
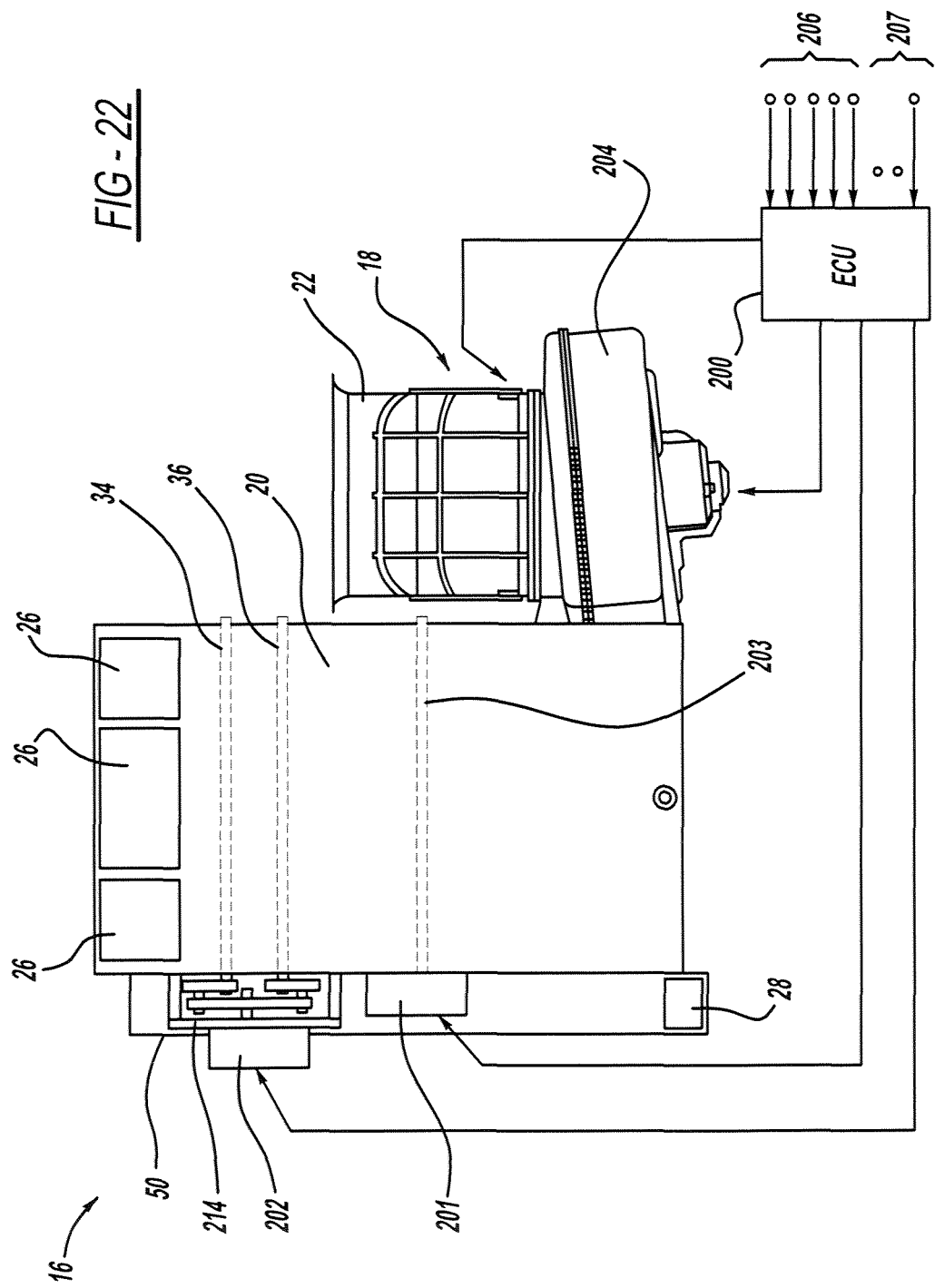
FIG. 22 is a plain view of an air conditioning apparatus according to the third embodiment.
Figure 23:
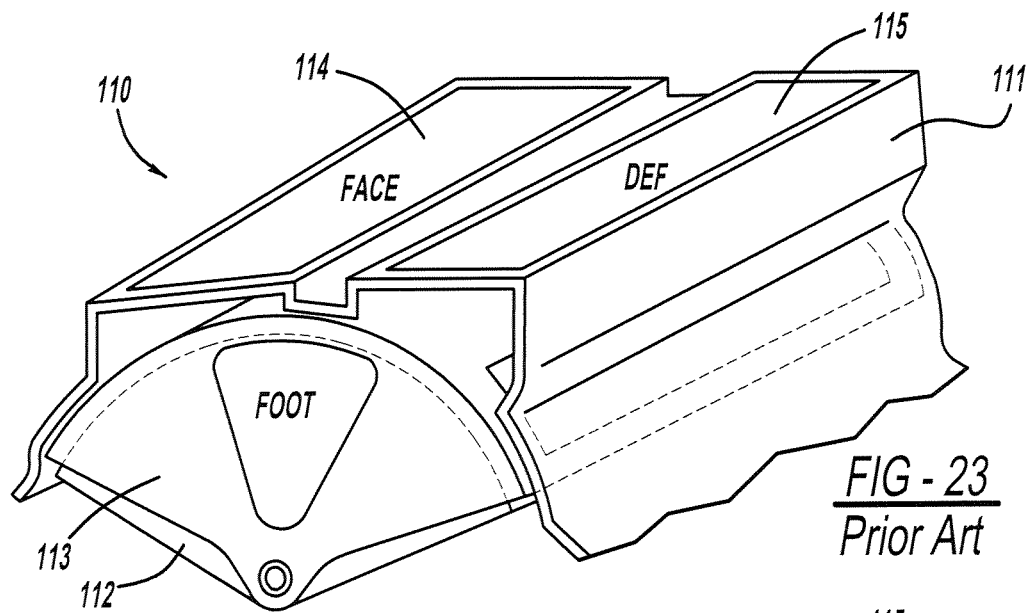
FIG. 23 is a cross-sectional perspective view of a mode selecting device of prior art.
Figure 24:
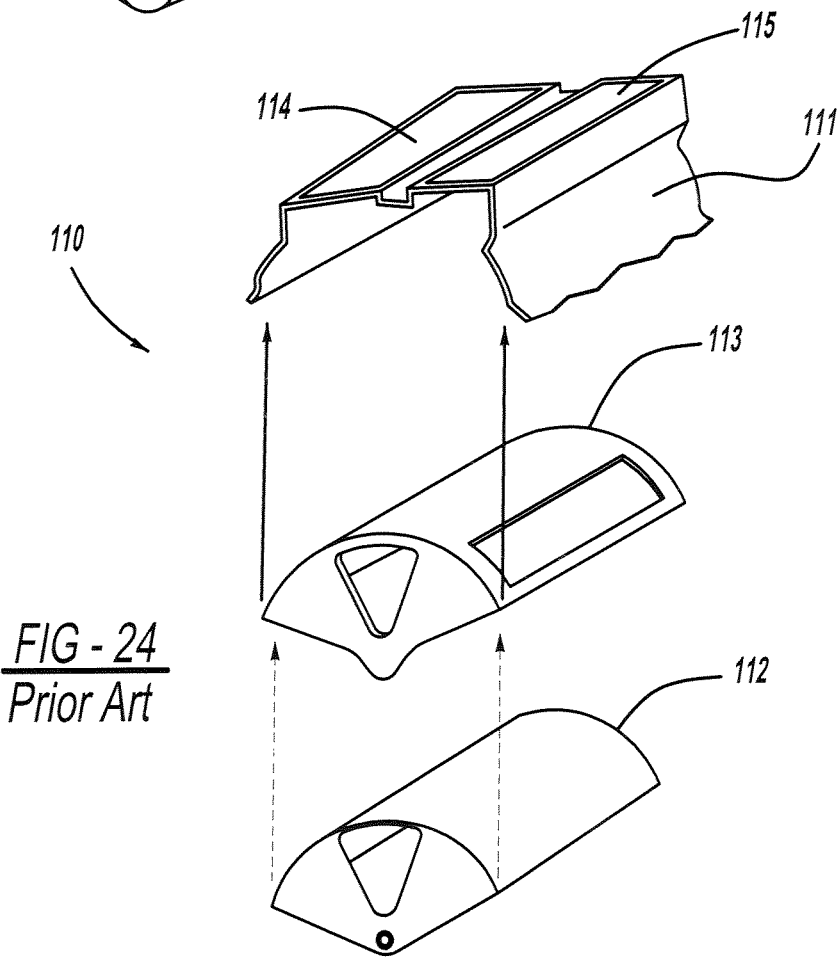
FIG. 24 is a cross-sectional perspective and exploded view of said mode selecting device depicted in FIG. 23.

FIG. 22 shows the third embodiment. In the above second embodiment, two domed doors 30, 32 are driven by two respective actuators 202. But in this third embodiment, one actuator 202 drives both outer domed door 30 and inner domed door 32 via the link mechanism 214.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claim is:

1. An air conditioning apparatus having a plurality of domed doors for controlling airflow comprising:
   a first domed door having a first pivot axis, a first end surface, and a first arm portion between the first pivot axis and the first end surface,
   a second domed door having a second pivot axis, a second end surface, and a second arm portion between the second pivot axis and the end surface; and
   an air conditioning case accommodating the first domed door and the second doomed door;
   wherein:
      said first pivot axis is positioned offset against the second pivot axis,
      said first domed door and said second domed door each can rotate relatively,
      said second domed door is at least partially nested in the first domed door;
      a distance from the first pivot axis to the first end surface is greater than a distance from the first pivot axis to the second end surface in all operative positions of the first and second domed doors; and
      one of a plurality of edges of the second end surface contacts the first domed door.

2. An air conditioning apparatus having a plurality of domed doors for controlling airflow according to the claim 1, wherein,
   the second domed door includes a seal member; and
   the one of said plurality of edges indirectly contacts the first domed door by way of the seal member.

3. An air conditioning apparatus having a plurality of domed doors for controlling airflow according to the claim 1, wherein,
   the air conditioning case defines an opening,
   the first end surface contacts the air conditioning case at one side of the opening,
   the second end surface contacts the air conditioning case at the other side of the opening.

4. An air conditioning apparatus having a plurality of domed doors for controlling airflow according to the claim 1 further comprising:
   a controller for driving the first domed door and the second domed door, wherein, the said controller starts moving the first domed door and the second domed door in different timing.

5. An air conditioning apparatus having a plurality of domed doors for controlling airflow according to the claim 4, wherein:
   said controller starts moving the second domed door, while the first domed door is still moving.

6. An air conditioning apparatus comprising:
   an air conditioning case defining a face opening and a foot opening;
   a first domed door having a first pivot axis, a first end surface and a first arm portion between the first pivot axis and the first end surface;
   a second domed door having a second pivot axis, a second end surface and a second arm portion between the second pivot axis and the second end surface;
   wherein:
   said first pivot axis is positioned offset against the second pivot axis,
   said second domed door is at least partially nested in the first domed door,
   said face opening is surrounded by a first contact portion provided in the air conditioning case, the first end surface contacts the first contact portion,
   the foot opening is surrounded by a second contact portion provided in the air conditioning case, the second end surface contacts the second contact portion,
   the first contact portion is at least partially set along a first circle, a center of the first circle is the same as the first pivot axis,
   the second contact portion is at least partially set along a second circle, a center of the second circle is the same as the second pivot axis, and
   said second domed door is at least partially nested in the first domed door;
   wherein:
      a distance from the first pivot axis to the first end surface is greater than a distance from the first pivot axis to the second end surface in all operative positions of the first and second domed doors; and
      one of a plurality of edges of the second end surface contacts the first domed door.

7. An air conditioning apparatus comprising according to claim 6, wherein,
   the air conditioning case further defines a defrost opening disposed between the face opening and the foot opening;
   the defrost opening is closed by both the first domed door and the second domed door.

8. An air conditioning apparatus comprising according to claim 6, wherein,
   the first pivot axis is disposed near the foot opening relative to the second pivot axis,
   the second pivot axis is disposed near the face opening relative to the first pivot axis.

9. An air conditioning apparatus comprising according to claim 6, wherein,
   an airflow passage defined by the air conditioning case defines a second row passenger opening disposed on a side wall of the air conditioning case, and
   the second row passenger opening is closed by the first arm portion.

10. An air conditioning apparatus comprising according to claim 6, wherein,
    the second domed door includes a seal member; and
    the one of said plurality of edges indirectly contacts the first domed door by way of the seal member.

11. An air conditioning apparatus comprising according to claim 6, wherein,
    one of a plurality of edges of the second end surface contacts the first domed door, and
    the first end surface and the second end surface both contact the air conditioning case.

12. An air conditioning apparatus comprising according to claim 6, further comprising:

a controller for driving the first domed door and the second domed door, wherein, the said controller starts moving the first domed door and the second domed door in different timing.

13. An air conditioning apparatus comprising according to claim 12, wherein, said controller starts moving the second domed door, while the first domed door is still moving.

14. An air conditioning apparatus having a plurality of domed doors for controlling airflow comprising:

a first domed door having a first pivot axis, a first end surface, and a first arm portion between the first pivot axis and the first end surface;

a second domed door having a second pivot axis, a second end surface, and a second arm portion between the second pivot axis and the end surface; and an air conditioning case accommodating the first domed door and the second doomed door;

wherein:
said first pivot axis is positioned offset against the second pivot axis;
said first domed door and said second domed door each can rotate relatively;
said second domed door is at least partially nested in the first domed door;
a distance from the first pivot axis to the first end surface is greater than a distance from the first pivot axis to the second end surface in all operative positions of the first and second domed doors;
the air conditioning case defines an opening;
the first end surface contacts the air conditioning case at one side of the opening;
the second end surface contacts the air conditioning case at the other side of the opening; and
the second domed door contacts the first domed door.

15. The air conditioning apparatus of claim 14, wherein the second domed door contacts the first domed door by way of a seal member of the second domed door.

* * * * *